US011158051B2

(12) United States Patent
Madabhushi et al.

(10) Patent No.: US 11,158,051 B2
(45) Date of Patent: Oct. 26, 2021

(54) STRUCTURAL RECTAL ATLAS DEFORMATION FEATURES FOR CHARACTERIZING INTRA-WALL AND PERI-WALL CHEMORADIATION RESPONSE ON MAGNETIC RESONANCE IMAGING (MRI)

(71) Applicant: Case Western Reserve University, Cleveland, OH (US)

(72) Inventors: Anant Madabhushi, Shaker Heights, OH (US); Jacob Antunes, Cincinnati, OH (US); Zhouping Wei, Cleveland, OH (US); Pallavi Tiwari, Wexford, PA (US); Satish E. Viswanath, Pepper Pike, OH (US)

(73) Assignee: Case Western Reserve University, Cleveland, OH (US)

( * ) Notice: Subject to any disclaimer, the term of this patent is extended or adjusted under 35 U.S.C. 154(b) by 0 days.

(21) Appl. No.: 16/882,936

(22) Filed: May 26, 2020

(65) Prior Publication Data
US 2021/0027468 A1      Jan. 28, 2021

Related U.S. Application Data

(60) Provisional application No. 62/879,044, filed on Jul. 26, 2019.

(51) Int. Cl.
*G06K 9/00*       (2006.01)
*G06T 7/00*       (2017.01)
(Continued)

(52) U.S. Cl.
CPC .......... *G06T 7/0014* (2013.01); *G06K 9/6234* (2013.01); *G06K 9/6256* (2013.01);
(Continued)

(58) Field of Classification Search
CPC ................... G06T 7/0012; G06T 7/11; G06T 2207/10088; G06T 2207/10081;
(Continued)

(56) References Cited

U.S. PATENT DOCUMENTS

| | | | |
|---|---|---|---|
| 2007/0019846 A1* | 1/2007 | Bullitt | G06T 7/0014 382/128 |
| 2008/0123927 A1* | 5/2008 | Miga | G06T 7/344 382/131 |

OTHER PUBLICATIONS

Zeng "An image classification model based on transfer learning for ulcerative Proctitis," Jan. 21, 2021, Springer, Multimedia Systems (Year: 2021).*

* cited by examiner

*Primary Examiner* — Alex Kok S Liew
(74) *Attorney, Agent, or Firm* — Eschweiler & Potashnik, LLC

(57) ABSTRACT

Embodiments discussed herein facilitate determination of responsiveness to chemoradiation treatment in rectal cancer patients based on structural deformation features obtained from a pre- or post-treatment medical imaging. One example embodiment can perform operations comprising: accessing an image volume of a rectum comprising a rectal tumor; generating a forward mapping based on non-rigidly registering a healthy rectal atlas to the image volume; inverting the forward mapping to generate an inverse mapping from the image volume to the healthy rectal atlas; determining, based on the inverse mapping, an associated deformation magnitude for each voxel of a plurality of voxels associated with the rectum; computing one or more structural deformation features based on the associated deformation magnitudes for the plurality of voxels; and predicting via a classifier whether or not the rectal tumor will respond to the
(Continued)

chemoradiation treatment based at least in part on the one or more structural deformation features.

29 Claims, 7 Drawing Sheets

(51) Int. Cl.
*G06T 7/40* (2017.01)
*G06K 9/62* (2006.01)
*G06T 7/33* (2017.01)

(52) U.S. Cl.
CPC ............ *G06K 9/6267* (2013.01); *G06T 7/337* (2017.01); *G06T 7/40* (2013.01); *G06T 2207/10088* (2013.01); *G06T 2207/20081* (2013.01); *G06T 2207/30096* (2013.01)

(58) Field of Classification Search
CPC ........... G06T 2207/30016; G06T 2207/10072; G06T 7/12; G06T 7/0014; G06T 2207/20081; G06T 7/33; G06T 2207/20128; G06T 2207/30004; G06T 2207/30061; G06T 2207/30081; G06T 7/143; G06T 7/344; G06T 7/149; G06T 2207/10028; G06T 2207/10056; G06T 2207/10132; G06T 2207/30024; G06T 2207/30068

See application file for complete search history.

STRUCTURAL RECTAL ATLAS DEFORMATION FEATURES FOR CHARACTERIZING INTRA-WALL AND PERI-WALL CHEMORADIATION RESPONSE ON MAGNETIC RESONANCE IMAGING (MRI)

CROSS REFERENCE TO RELATED APPLICATIONS

This application claims the benefit of U.S. Provisional Patent Application No. 62/879,044 filed Jul. 26, 2019, entitled "STRUCTURAL RECTAL ATLAS DEFORMATION (STRAD) FEATURES FOR CHARACTERIZING INTRA- AND PERI-WALL CHEMORADIATION RESPONSE ON MAGNETIC RESONANCE IMAGING (MRI)", the contents of which are herein incorporated by reference in their entirety.

FEDERAL FUNDING NOTICE

This invention was made with government support under the grants CA199374, CA202752, CA208236, CA216579, CA220581, CA216935, RR012463, EB750912, EY022947, DK097948, and EB007509 awarded by the National Institutes of Health; grants W8IXWH-15-1-0558, W8IXWH-16-1-0329, W8IXWH-18-1-0440 awarded by the Department of Defense; and grant IBX004121A awarded by the United States Department of Veterans Affairs. The government has certain rights in the invention.

BACKGROUND

The advent of radiomics has demonstrated great success for predicting and evaluating treatment response via imaging in different cancers. Radiomic approaches have typically extracted morphologic texture or shape descriptors of the tumor region, which have been related to underlying pathologic or molecular heterogeneity that drive therapy response. As an example, prediction of response to chemoradiation in rectal cancers via pre- or post-treatment MRI has been limited to using morphologic radiomic descriptors for image appearance alone. Unlike deep learning approaches (which are data-driven solutions to lesion segmentation, localization, or detection), radiomics also leverages "handcrafted" descriptors to quantify specific imaging characteristics both within and around the tumor. For instance, new classes of features that quantify tissue deformations or surface distensions on imaging have been linked to aggressive tumor growth as well as tumor recurrence, based on available reference atlas representations in solid organs such as the brain or the prostate.

BRIEF DESCRIPTION OF THE DRAWINGS

The accompanying drawings, which are incorporated in and constitute a part of the specification, illustrate various example operations, apparatus, methods, and other example embodiments of various aspects discussed herein. It will be appreciated that the illustrated element boundaries (e.g., boxes, groups of boxes, or other shapes) in the figures represent one example of the boundaries. One of ordinary skill in the art will appreciate that, in some examples, one element can be designed as multiple elements or that multiple elements can be designed as one element. In some examples, an element shown as an internal component of another element may be implemented as an external component and vice versa. Furthermore, elements may not be drawn to scale.

DETAILED DESCRIPTION

Figure 1:
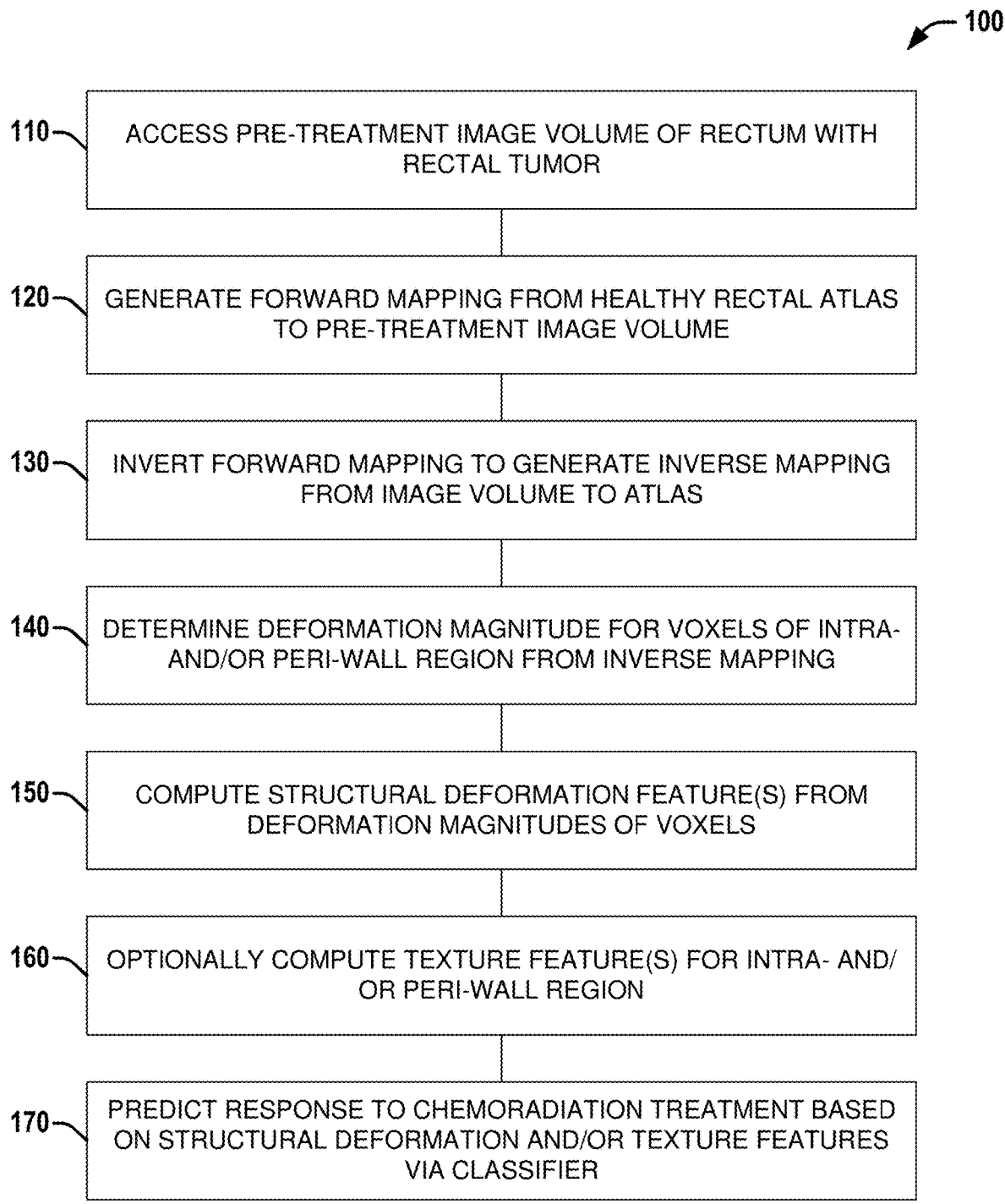
FIG. 1 illustrates a flow diagram of an example method/set of operations that can be performed by one or more processors to predict a response to chemoradiation treatment based on structural deformation features and/or texture features of a pre-treatment imaging volume of a rectum with rectal cancer, according to various aspects discussed herein.

Various embodiments discussed herein can comprise techniques that can facilitate determination of response of rectal cancer to chemoradiation treatment based on pre-treatment medical imaging (e.g., MRI (Magnetic Resonance Imaging)) and/or post-treatment medical imaging of a patient. Based on mapping of a healthy rectal atlas to the medical imaging of the patient, one or more structural features can be determined. Based on a set of features comprising the one or more structural features and/or one or more texture features, a determination can be made regarding chemoradiation response for the patient via a classifier trained on the set of features.

Techniques discussed herein can be employed by various embodiments to one or more of: (a) predict a response to chemoradiation treatment from pre-treatment medical imaging of rectal cancer, (b) determine whether rectal cancer is likely to regress following chemoradiation treatment based on post-treatment medical imaging of rectal cancer, or (c) train a classifier to facilitate one or more of (a) or (b). The techniques discussed herein comprise techniques that facilitate: (1) construction of a healthy structural rectal atlas; (2) computing structural deformations of medical imaging of a rectal cancer patient with respect to the atlas; (3) extracting structural and/or texture features from subregions within the rectal wall and/or peri-rectal environment from the imaging of the patient; (4) training classifier(s) to predict response to chemoradiation treatment and/or determine tumor regression following chemoradiation treatment; (5) predicting response or non-response to chemoradiation treatment from baseline medical imaging; and/or (6) identifying good or poor responders after chemoradiation treatment from post-therapy medical imaging. Each of these techniques are discussed in greater detail below, along with example application of specific techniques in connection with a use case, although the specific techniques employed can vary, depending on the embodiment.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic or circuit, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, calculating, determining, and so on, refer to actions and processes of a computer system, logic, circuit, processor, or similar electronic device that manipulates and transforms data represented as physical (electronic) quantities.

Example methods and operations may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Referring to FIG. 1, illustrated is a flow diagram of an example method/set of operations 100 that can be performed by one or more processors to predict a response to chemoradiation treatment based on structural deformation features and/or texture features of a pre-treatment imaging volume of a rectum with rectal cancer, according to various aspects discussed herein. Processor(s) can include any combination of general-purpose processors and dedicated processors (e.g., graphics processors, application processors, etc.). The one or more processors can be coupled with and/or can include memory or storage and can be configured to execute instructions stored in the memory or storage to enable various apparatus, applications, or operating systems to perform the operations. The memory or storage devices may include main memory, disk storage, or any suitable combination thereof. The memory or storage devices can comprise—but is not limited to—any type of volatile or non-volatile memory such as dynamic random access memory (DRAM), static random-access memory (SRAM), erasable programmable read-only memory (EPROM), electrically erasable programmable read-only memory (EEPROM), Flash memory, or solid-state storage.

The set of operations 100 can comprise, at 110, accessing an image volume of the rectum of a patient with rectal cancer, wherein the image volume was obtained prior to chemoradiation treatment. In various embodiments and in the example use case discussed below, the image volume can comprise a Magnetic Resonance Imaging (MRI) image volume. In other embodiments, other medical imaging techniques can be employed to obtain the image volume. The image volume can be obtained via a system and/or apparatus implementing the set of operations 100, or can be obtained from a separate medical imaging system. Additionally, the image volume can be accessed contemporaneously with or at any point prior to performing the set of operations 100.

The set of operations 100 can further comprise, at 120, generating a forward mapping from a healthy rectal atlas (e.g., generated according to techniques discussed herein, etc.) to the image volume via techniques discussed herein (e.g., via non-rigid registration, etc.).

The set of operations 100 can further comprise, at 130, inverting the forward mapping to generate an inverse mapping from the image volume to the healthy rectal atlas.

The set of operations 100 can further comprise, at 140, determining a deformation magnitude relative to the healthy rectal atlas for each voxel of an intra-wall and/or peri-wall region of a region of interest based on the inverse mapping (e.g., in one or more sites N consecutive slices associated with a tumor, etc.).

The set of operations 100 can further comprise, at 150, computing one or more structural deformation features from the deformation magnitudes of intra-wall and/or peri-wall voxels. The one or more structural deformation features can comprise statistical measures of the intra-wall voxels and/or statistical measures of the peri-wall voxels.

The set of operations 100 can further comprise, at 160, optionally computing one or more texture features for the intra-wall region and/or one or more texture features for the peri-wall region.

The set of operations 100 can further comprise, at 170, predicting a response to chemoradiation treatment based on the one or more structural deformation features and/or the one or more texture features via a classifier trained according to aspects discussed herein.

Additionally or alternatively, set of operations 100 can comprise one or more other actions discussed herein in connection with predicting a response to chemoradiation treatment based on pre-treatment medical imaging.

Figure 2:
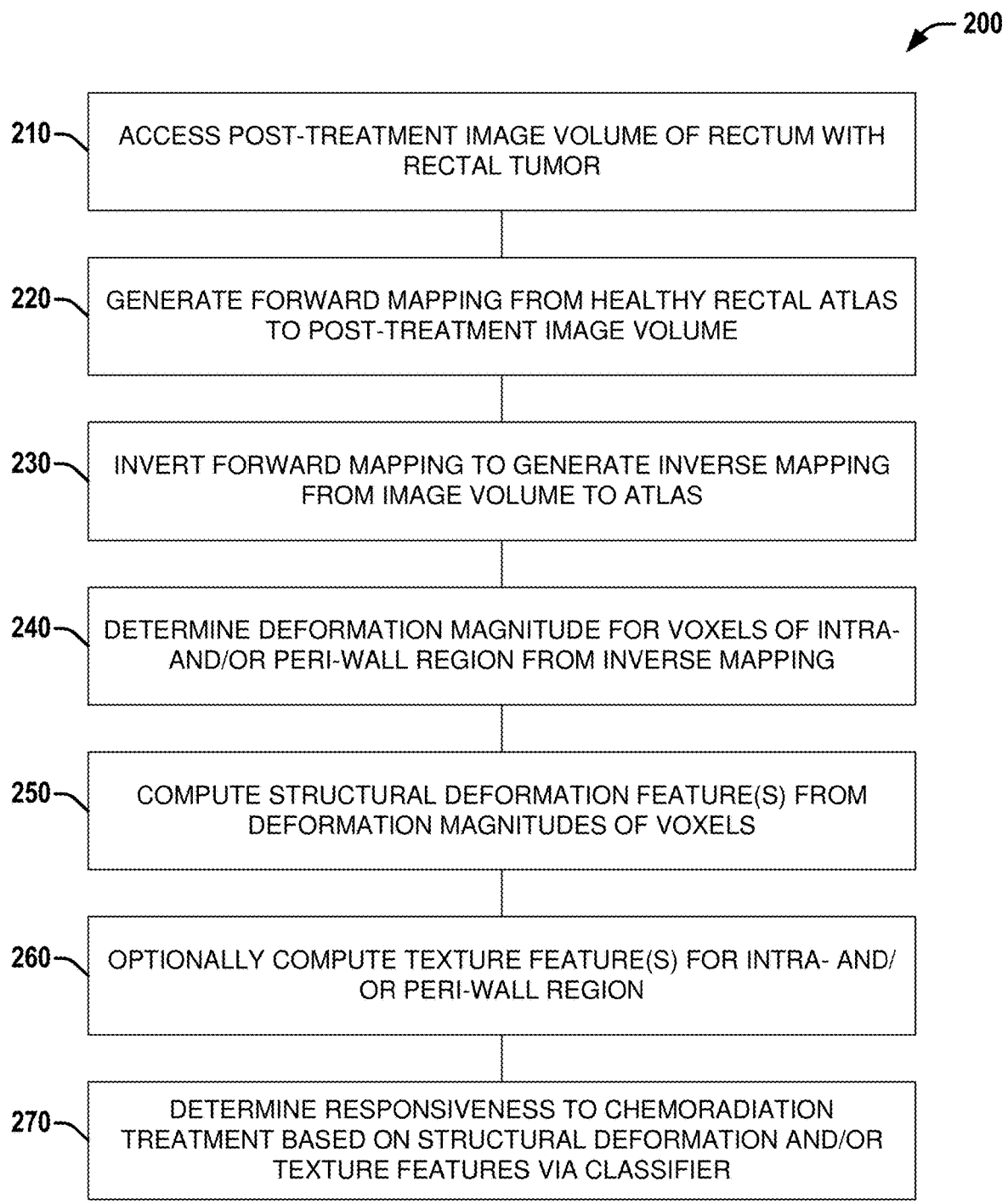
FIG. 2 illustrates a flow diagram of an example method/set of operations that can be performed by one or more processors to determine responsiveness to chemoradiation treatment based on structural deformation features and/or texture features of a post-treatment imaging volume of a rectum with rectal cancer, according to various aspects discussed herein.

Referring to FIG. 2, illustrated is a flow diagram of an example method/set of operations 200 that can be performed by one or more processors to determine responsiveness to chemoradiation treatment based on structural deformation features and/or texture features of a post-treatment imaging volume of a rectum with rectal cancer, according to various aspects discussed herein.

The set of operations 200 can comprise, at 210, accessing an image volume of the rectum of a patient with rectal cancer, wherein the image volume was obtained after chemoradiation treatment. In various embodiments and in the example use case discussed below, the image volume can comprise a MRI image volume. In other embodiments, other medical imaging techniques can be employed to obtain the image volume. The image volume can be obtained via a system and/or apparatus implementing the set of operations 200, or can be obtained from a separate medical imaging system. Additionally, the image volume can be accessed contemporaneously with or at any point prior to performing the set of operations 200.

The set of operations 200 can further comprise, at 220, generating a forward mapping from a healthy rectal atlas (e.g., generated according to techniques discussed herein, etc.) to the image volume via techniques discussed herein (e.g., via non-rigid registration, etc.).

The set of operations 200 can further comprise, at 230, inverting the forward mapping to generate an inverse mapping from the image volume to the healthy rectal atlas.

The set of operations 200 can further comprise, at 240, determining a deformation magnitude relative to the healthy rectal atlas for each voxel of an intra-wall and/or peri-wall region of a region of interest based on the inverse mapping (e.g., in one or more sites comprising N consecutive slices associated with a tumor, etc.).

The set of operations 200 can further comprise, at 250, computing one or more structural deformation features from the deformation magnitudes of intra-wall and/or peri-wall voxels. The one or more structural deformation features can comprise statistical measures of the intra-wall voxels and/or statistical measures of the peri-wall voxels.

The set of operations 200 can further comprise, at 260, optionally computing one or more texture features for the intra-wall region and/or one or more texture features for the peri-wall region.

The set of operations 200 can further comprise, at 270, determining responsiveness to chemoradiation treatment (e.g., classification as a good responder or non-responder, etc.) based on the one or more structural deformation features and/or the one or more texture features via a classifier trained according to aspects discussed herein.

Additionally or alternatively, set of operations 200 can comprise one or more other actions discussed herein in connection with determining responsiveness to chemoradiation treatment based on post-treatment medical imaging.

Figure 3:
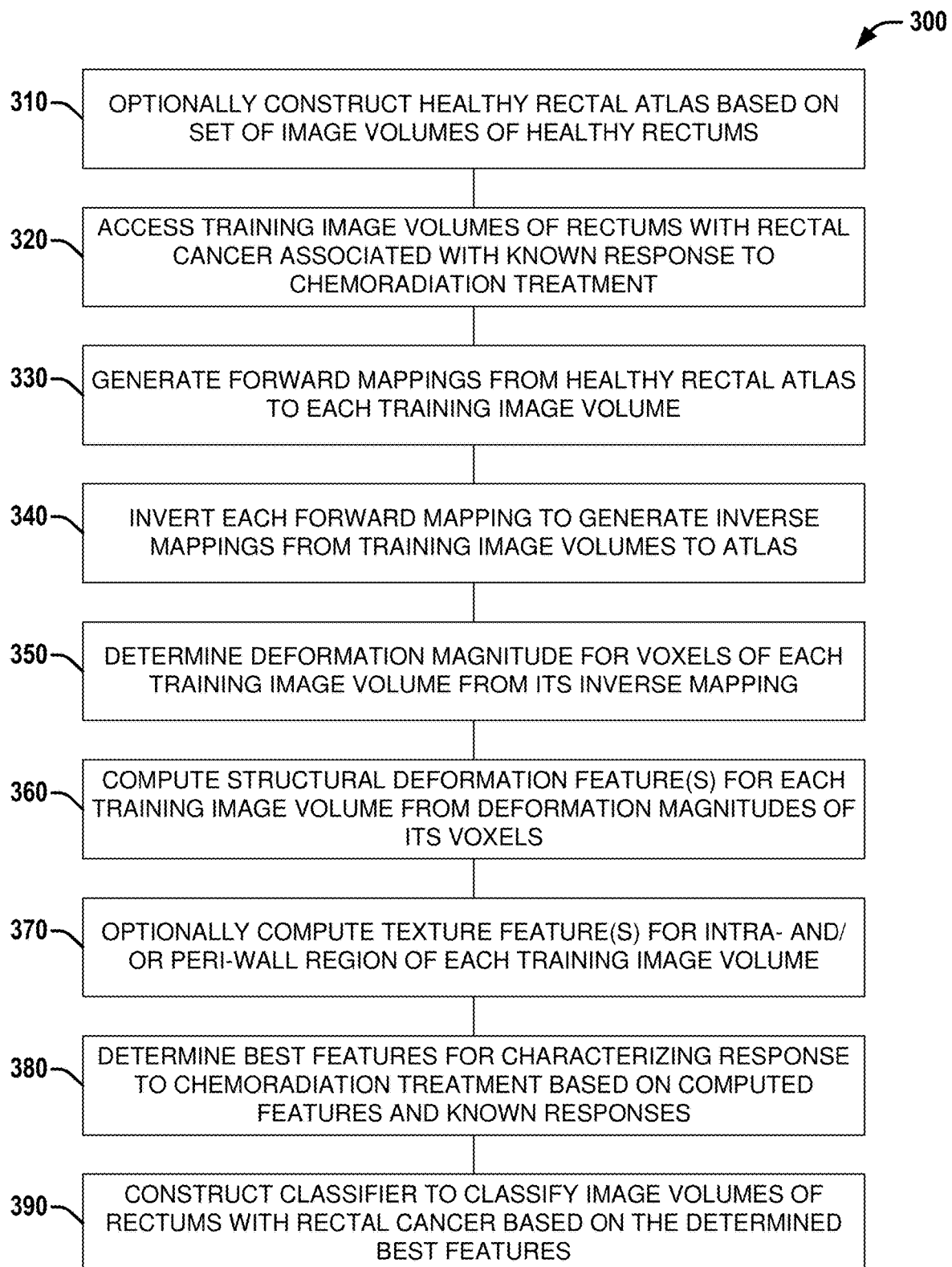
FIG. 3 illustrates a flow diagram of an example method/set of operations that can be performed by one or more processors to determine responsiveness to chemoradiation treatment based on structural deformation features and/or texture features of a post-treatment imaging volume of a rectum with rectal cancer, according to various aspects discussed herein.

Referring to FIG. 3, illustrated is a flow diagram of an example method/set of operations 300 that can be performed by one or more processors to train a Machine Learning (ML) classifier to predict or determine responsiveness of rectal cancer to chemoradiation treatment based on structural deformation and/or texture features of pre- or post-treatment medical imaging, according to various aspects discussed herein.

The set of operations 300 can comprise, at 310, optionally constructing a healthy rectal atlas based on a set of image volumes of healthy rectums, according to techniques discussed herein. In other embodiments, a previously constructed healthy rectal atlas can be employed by the set of operations 300. In various embodiments and in the example use case discussed below, image volumes employed by set of operations 300 can comprise MRI image volumes. In other embodiments, other medical imaging techniques can be employed to obtain the image volumes. The image volumes can be obtained via a system and/or apparatus implementing the set of operations 300, or can be obtained from a separate medical imaging system. Additionally, the image volumes can be accessed contemporaneously with or at any point prior to performing the set of operations 300.

The set of operations 300 can further comprise, at 320, accessing a training set of image volumes of rectums of patients with rectal cancer. Each of the image volumes in the training set can be associated with a known response to chemoradiation treatment by the patient of that image volume. In some embodiments, each image volume of the training set can comprise baseline imaging taken prior to chemoradiation treatment, while in other embodiments, each image volume of the training set can comprise imaging taken after chemoradiation treatment.

The set of operations 300 can further comprise, at 330, generating an associated forward mapping from a healthy rectal atlas (e.g., generated according to techniques discussed herein, etc.) to each image volume of the training set via techniques discussed herein (e.g., via non-rigid registration, etc.).

The set of operations 300 can further comprise, at 340, inverting the forward mapping for each image volume of the training set of the training set to generate an inverse mapping from that image volume to the healthy rectal atlas.

The set of operations 300 can further comprise, at 350, determining a deformation magnitude relative to the healthy rectal atlas for each voxel of an intra-wall and/or peri-wall region of a region of interest of each image volume of the training set based on the inverse mapping for that image volume (e.g., in one or more sites of N consecutive slices associated with a tumor, etc.).

The set of operations 300 can further comprise, at 360, computing one or more structural deformation features for each image volume of the training set from the deformation magnitudes of intra-wall and/or peri-wall voxels of that image volume. The one or more structural deformation features can comprise statistical measures of the intra-wall voxels and/or statistical measures of the peri-wall voxels.

The set of operations 300 can further comprise, at 370, for each image volume of the training set, optionally computing one or more texture features for the intra-wall region of that image volume and/or one or more texture features for the peri-wall region of that image volume.

The set of operations 300 can further comprise, at 380, determining one or more best features for characterizing response to chemoradiation treatment based on the known responses to chemoradiation treatment for the patients, the computed structural deformation features for each image volume of the training set, and optionally the computed texture features for each image volume of the training set. Feature selection can be as discussed in connection with the example use case, or can employ other feature selection algorithms.

The set of operations 300 can further comprise, at 390, constructing a machine learning (ML) classifier trained to classify image volumes as responsive or non-responsive to chemoradiation treatment based on values determined for that image volume for the best features determined at 380.

Additionally or alternatively, set of operations 300 can comprise one or more other actions discussed herein in connection with training a classifier to predict or determine responsiveness to chemoradiation treatment based on post-treatment medical imaging.

Additional aspects and embodiments are discussed below in connection with the following example use case.
Example Use Case: Structural Rectal Atlas Deformation Features for Characterizing Intra- and Peri-Wall Chemoradiation Response on MRI The following discussion provides example embodiments in connection with an example use case involving determination of chemoradiation response in rectal cancer based on pre-treatment MRI or based on post-treatment MRI via techniques discussed herein. These techniques comprise: (1) construction of a healthy structural rectal atlas; (2) computing structural deformations of medical imaging of a rectal cancer patient with respect to the atlas; (3) extracting structural and/or texture features from subregions within the rectal wall and/or peri-rectal environment from the imaging of the patient; (4) training classifier(s) to predict response to chemoradiation treatment and/or determine tumor regression following chemoradiation treatment; (5) predicting response or non-response to chemoradiation treatment from baseline medical imaging; or (6) identifying good or poor responders after chemoradiation treatment from post-therapy medical imaging. Each of techniques (1)-(6) are described in greater detail below. Although specific details and aspects were employed for the example use case as a specific concrete embodiment, it is to be appreciated that in various embodiments, these details and aspects can vary.

A. Overview

Radiomic features which quantify morphologic texture and shape of tumor regions on imaging have found wide success in characterizing treatment response in vivo. A more detailed interrogation of intra- and peri-tumoral regions for response-related cues could be achieved by capturing subtle structural deformations that occur due to tumor shrinkage or growth. The example use case employed a set of Structural Rectal Atlas Deformation features to quantify tumor-related deformations in rectal cancers via a cohort of 139 patient MRIs. In flexible non-rigid organs such as the rectum, inter-patient differences complicate evaluation of tumor-related deformations that may occur within the rectal wall or in the peri-rectal environment; necessitating construction of a canonical rectal imaging atlas. Using 63 pelvic MRIs where healthy rectums could be clearly visualized, the example use case employed the first structural atlas built for the healthy rectal wall. This atlas was used to compute structural deformations within and around locations in the rectal wall of patients where tumor was present, resulting in intra- and peri-wall Structural Rectal Atlas Deformation descriptors. The example use case evaluated the efficacy of these Structural Rectal Atlas Deformation features in 2 different tasks: (a) predicting which rectal tumors will or will not respond to therapy via baseline MRIs (n=42), and (b) identifying which rectal tumors were exhibiting regression on post-chemoradiation MRIs (n=34). Using a linear discriminant analysis classifier in a three-fold cross-validation scheme, it was found that intra-wall deformations were significantly lower for responders to chemoradiation; both on baseline MRIs (with AUC (Area Under ROC (Receiver Operating Characteristic) Curve)=0.73±0.05) as well as on post-therapy MRIs (AUC=0.87±0.03). By comparison, radiomic texture features for both intra- and peri-wall locations yielded significantly worse classification performance in both tasks.

As discussed above, for solid organs such as the brain or prostate, new classes of features that quantify tissue deformations or surface distensions on imaging have been linked to aggressive tumor growth and tumor recurrence. Quantifying such structural changes in more flexible organs such as the rectum requires construction of a healthy rectal wall atlas (e.g., the rectal anatomy without a tumor). In connection with the example use case, it was hypothesized that constructing a healthy rectal atlas could then allow for a unique quantification of disease-specific structural changes in the rectal environment (wall/tumor, peri-wall/tumor) that may be closely related to tumor response to therapy. The hypothesis was tested via the following aspects of the example use case (discussed in greater detail below): (1) Development of the first structural atlas representation for healthy rectal wall anatomy, via a multi-stage registration scheme using pelvic MRIs (from other cancers) where normal rectums are visible and (2) The first attempt at relating subtle structural deformations occurring within and around rectal wall regions to chemoradiation-related tumor growth or shrinkage in vivo.

The Structural Rectal Atlas Deformation features discussed herein were evaluated in the context of two distinct clinical problems in rectal cancer: (a) prediction of pathologic non-responders to chemoradiation via baseline treatment-naïve MRI, and (b) assessment of pathologic responders on post-chemoradiation MRI. Together, these two problems represent the major clinical challenges facing personalization of patient management in rectal cancers.

B. Methodology

Quantifying structural deformations within and around the rectum involves the following 3 acts: (i) building a structural atlas for normal rectal wall anatomy on imaging, (ii) computing structural deformations of the rectal wall in patients with tumors with respect to this atlas, and (iii) extracting tumor-related structural deformation descriptors within the rectal wall and peri-rectal environment.

Figure 4:
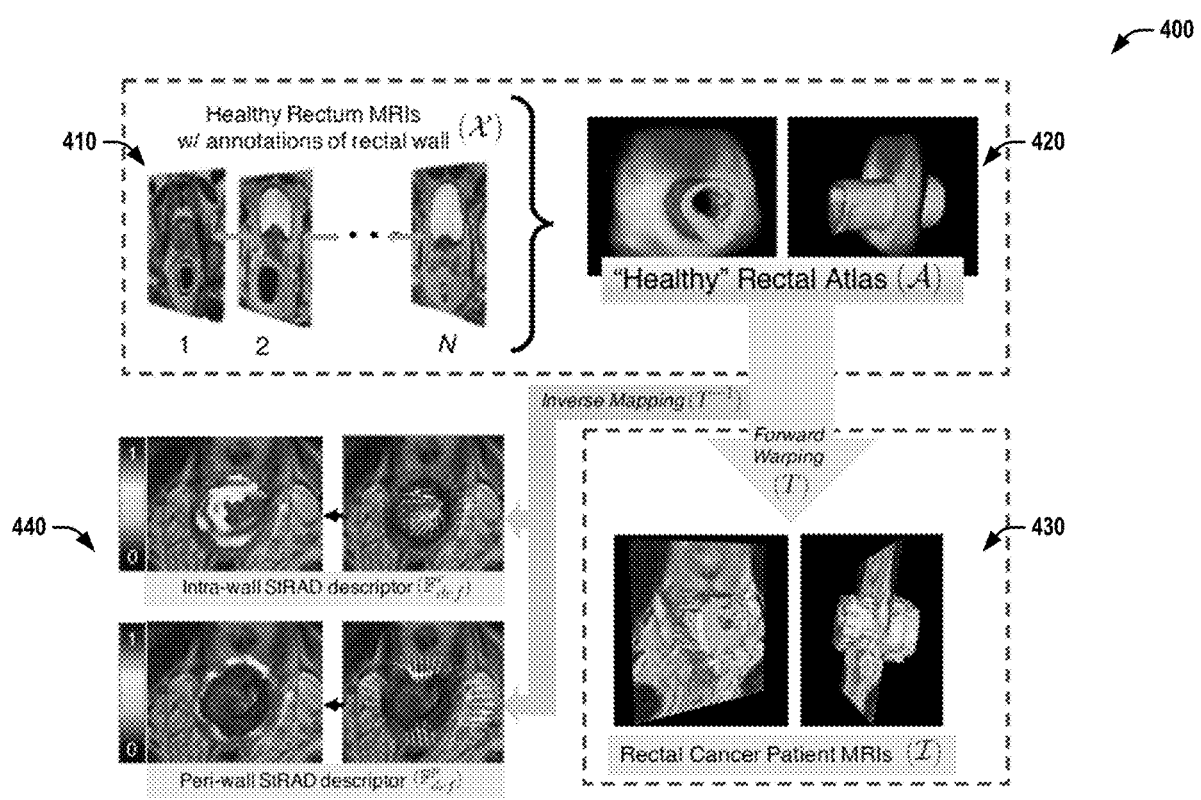
FIG. 4 illustrates a series of example diagrams showing actions involved in extracting Structural Rectal Atlas Deformation features from a patient MRI, according to various aspects discussed herein.

Referring to FIG. 4, illustrated is a series of example diagrams 400 showing actions involved in extracting Structural Rectal Atlas Deformation features from a patient MRI, according to various aspects discussed herein. At 410, a set of healthy rectum MRI images with annotated rectal walls (e.g., via expert annotation, etc) can be obtained. At 420, a healthy rectal atlas can be constructed from the healthy rectum MRI images according to techniques discussed herein. At 430, a forward mapping from the atlas to the MRI of a rectal cancer patient can be determined. At 440, based on the forward mapping, an inverse mapping from the MRI of the patient to the atlas can be determined, based on which deformations within and around the rectal wall with respect to the atlas can be determined. At 450, based on the determined deformations, structural deformation features can be extracted for an intra-wall and/or peri-wall region of the MRI of the patient.

Construction of Structural Rectal Atlas

A set of N MRI scenes depicting the healthy rectum was utilized, and denoted X=(C, f), where C is a 3-dimensional spatial grid and f(c) represents the MRI intensity at each voxel c∈C. The primary anatomic region defined within this MRI scene is the healthy rectal wall, denoted $X^r$=(C, $f^r$), where $f^r(c)$=1 within the rectal wall and zero in the rest of the scene. $X^r$ can be identified and annotated by experts on all X, and is depicted in the images of 410 in FIG. 4.

The final output of this construction is the healthy rectal wall atlas, denoted A=(C, $g^r$), with $g^r(c)\in[0,1]$ defined as the frequency of a particular location c∈C where $f^r(c)$=1 (e.g., corresponding to rectal wall); across N different input subject scenes. These N different subject scenes were aligned to a registration template for projection into a canonical space to construct A, via the following three transformations.

The first transformation can be a simple transformation, $\tau_\rho$, that is used to map N different subject scenes X such that they are all centered and isotropically scaled in the X, Y, and Z axes. The resulting initial atlas, $A_\rho$, is therefore not dependent on selecting a specific subject as the template and can be constructed such that $A_\rho$=(C, $g^r$), where $$g^r(c) = \frac{1}{N}\Sigma_N f^r(c),$$

for every location c∈C, across all N studies after $\tau_\rho$ has been applied (e.g., $g^r(c)$ is the frequency of a location corresponding to the rectal wall).

In the second transformation, affine registration can be used to compute $\tau_\alpha$ for projecting all X onto $A_\rho$. The affinely transformed subject scenes can be used to construct $A_\alpha=(C, g^r)$ (based on re-computing $g^r(c) \forall c \in C$, across all N studies).

In the third transformation, deformable registration can be used to align X to $A_\alpha$. The final structural rectal atlas $A=(C, g^r)$, can be constructed based on re-computing $g^r(c) \forall c \in C$, across N deformed subject scenes.

Computing Structural Deformations with Respect to the Atlas

Given a rectal cancer patient MRI scene, denoted I, structural deformations in the rectal environment can be quantified with respect to the healthy atlas A. The rectal wall within the patient MRI scene is denoted $I^r$. First, A can be non-rigidly registered to I using a normalized mutual information-based similarity measure within a b-spline registration scheme. This non-rigid alignment can be formulated as $(I^r, I)=T(A)$, where T is the forward transformation of the composite voxel-wise deformation field (comprising affine and deformable components) that maps the rectal wall between the reference ($I^r$) and floating (A) volumes. This transformation can then be inverted to yield $T^{-1}$, which can be used to map I into the A space. This two-stage mapping process can be employed to compute structural deformations within I with respect to A at every $c \in C$, hypothesized to occur as a result of tumor-related growth or shrinkage of the rectal wall.

Extracting Structural Rectal Atlas Deformation (StRAD) Descriptors for Subregions Within Rectal Wall and Peri-Rectal Environment Structural deformations can be quantified for each rectal cancer patient scene within $I^r$, as well for a peri-wall area denoted $I^p$. The latter was defined based on $I^r$ within each of the experiments later conducted. Once I is mapped to the A space, all voxel positions $(c_x, c_y, c_z)$ can be assumed to be displaced by $[\delta_x, \delta_y, \delta_z]$, to result in $(c'_x, c'_y, c'_z) = (c_x, c_y, c_z) + [\delta_x, \delta_y, \delta_z]$. Based on this displacement vector, the deformation magnitude can be computed as $D(c) = \sqrt{(\delta_x)^2 + (\delta_y)^2 + (\delta_z)^2}$, for every $c \in C$. The descriptor $\mathbb{F}_{def}^r$ for intra-wall deformations can comprise first order statistics (e.g., mean, median, standard deviation, skewness, and kurtosis) of D(c) for all the voxels c within the rectal wall $I^r$. Similarly, the peri-wall deformation descriptor $\mathbb{F}_{def}^r$ can be computed based on first-order statistics of the deformation magnitudes in $I^p$.

Experimental Design

Data Description

Healthy rectum cohort ($S_1$): A cohort of 63 patients who had been diagnosed with prostate cancer and had undergone an axial pelvic MRI scan were curated. These scans were selected based on having the healthy rectal wall being clearly visible, as no endorectal coil had been used.

Baseline RCa cohort ($S_2$): A cohort of 42 patients who had been diagnosed with rectal cancer were identified, all of whom had undergone axial 3 Tesla (T) T2w MR imaging before standard-of-care chemoradiation. A first objective of the example use case was to predict non-responders to chemoradiation using this baseline MRI scan. Pathologic tumor stage (T-stage, based on excised rectal specimens) was used as a marker of response, where ypT3-4 corresponded to extensive tumor being present in the specimen despite chemoradiation. Based on this pathologic classification, n=22 patients were identified as being non-responsive to chemoradiation (ypT3-4), and the remainder as good responders to chemoradiation (ypT0-2, n=20).

Post-therapy RCa cohort ($S_3$): A separate cohort of 34 RCa patients was curated, where patients had axial 3 T T2w MRIs available after undergoing standard-of-care chemoradiation but prior to excision surgery. In this cohort, the goal was to identify which patients exhibited marked tumor regression (based on pathologic T-stage) via the post-therapy MRI scan. With ypT0-2 indicating minimal or dying tumor within the rectal wall after chemoradiation, n=17 patients were assessed as being good responders and the remaining n=17 were classified as exhibiting minimal or no response to chemoradiation (ypT3-4).

Implementation Details

For all 139 MRI scans in cohorts $S_{1-3}$, the entire length of the visible rectal wall from the anus to the peritoneal reflection was annotated by an expert radiologist. For the 76 RCa cases in $S_2$ and $S_3$, the slices most suspicious for tumor presence were also identified by the radiologist (using anatomic information from pathology reports). The healthy atlas A was constructed using N=63 MRI pelvic scans in $S_1$ using the approach discussed herein. Evaluation of the atlas in terms of overlap in annotated rectal wall as well as internal lumen regions (across all patients in $S_1$ after deformable mapping) yielded a Dice similarity coefficient of 0.87, indicating A was a relatively accurate representation.

Deformation fields for the remaining 79 RCa scans in $S_2$ and $S_3$ (with respect to A) were then computed to yield intra-wall and peri-wall StRAD descriptors, $\mathbb{F}_{def}^r$ and $\mathbb{F}_{def}^p$, respectively (each a 5×1 vector in the example use case, although the size can vary in different embodiments). The peri-wall region was empirically defined as an 8 pixel band along the outer wall boundary for $S_2$ and $S_3$. All registration steps were implemented using elastix, with a grid spacing of 9×9×9 (in the example use case, although the size can vary in different embodiments) when computing b-spline deformations. Radiomic texture features were also extracted to characterize the appearance of intra- and peri-wall areas on all 79 RCa scans, yielding $\mathbb{F}_{tex}^r$ and $\mathbb{F}_{tex}^p$ (each a 825×1 vector in the example use case, although the size can vary in different embodiments). Both deformation and texture features were extracted from 3 consecutive slices (the number of slices can vary depending on the embodiment) comprising the largest wall area suspicious for tumor, assuming that this region was most likely to exhibit signatures related to tumor growth or shrinkage on MRI.

Separate experiments were conducted using each of $S_2$ and $S_3$ in a cross-validation setting, with the goal of distinguishing between the 2 patient groups in each cohort. Following feature extraction, minimum redundancy maximum relevance feature selection (mRMR) was used to identify the 3 most relevant features (although a different number could be employed in various embodiments) within each of $\mathbb{F}_{def}^r$, $\mathbb{F}_{def}^p$, $\mathbb{F}_{tex}^r$, and $\mathbb{F}_{tex}^p$. The most relevant set of features from each vector was then evaluated via a Linear Discriminant Analysis (LDA) classifier (although other machine learning classifiers can be employed in various embodiments, e.g., Quadratic Discriminant Analysis (QDA), Support Vector Machine (SVM), Random Forest (RF), etc.). A total of 50 iterations (in various embodiments, the number of iterations can vary) of a three-fold (e.g., with one fold held-out for testing), patient-stratified, cross-validation scheme were utilized to ensure robustness of feature selection and classifier evaluation steps; with Receiver Operating Characteristic (ROC) analysis for evaluation. These steps were repeated for each of $S_2$ and $S_3$, and the area under the ROC curve (AUC) across all cross-validation runs was used to compare each of $\mathbb{F}_{def}^r$, $\mathbb{F}_{def}^p$, $\mathbb{F}_{tex}^r$, and $\mathbb{F}_{tex}^p$ (via Wilcoxon ranksum testing, although other feature selecting algorithms can be employed in various embodiments) to determine which feature set was most relevant for treatment response characterization.

Results and Discussion

Experiment 1: Predicting Non-Responders to Chemoradiation via Baseline MRIs

Figure 5:
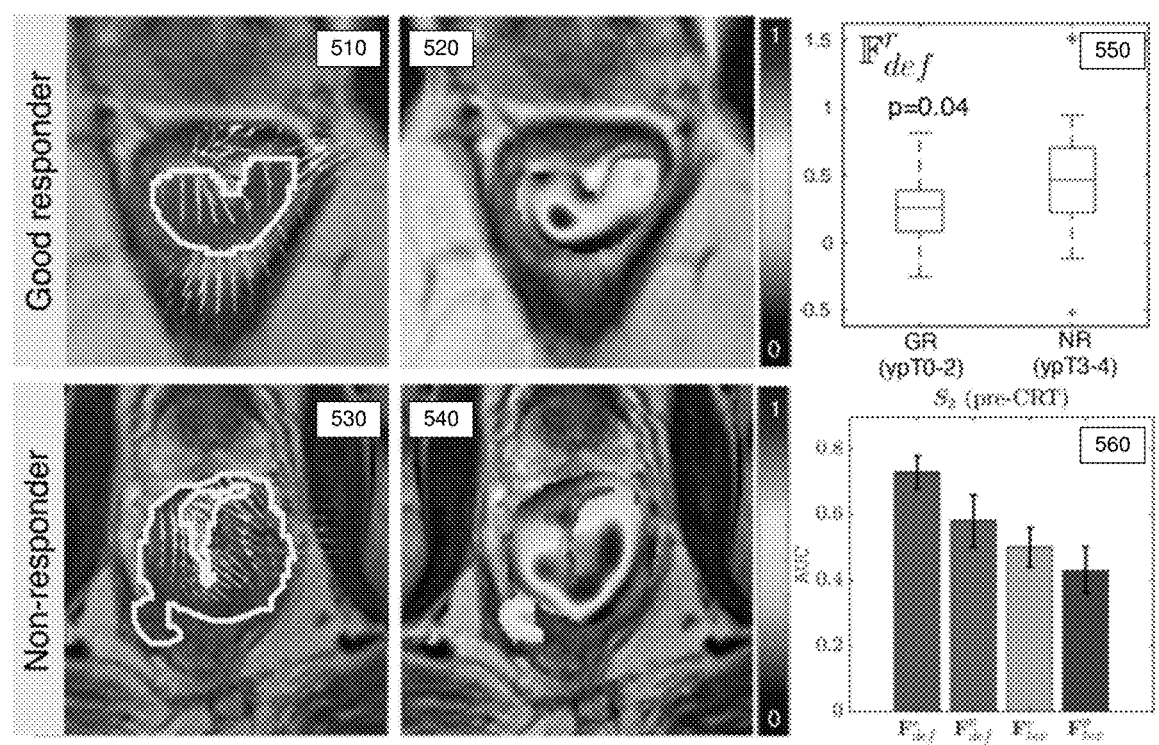
FIG. 5 illustrates example diagrams and graphs associated with predicting non-responders to chemoradiation via baseline MRIs in the example use case, according to various aspects discussed herein.

The most relevant StRAD descriptors identified in experimental evaluation of $S_2$ were the skewness and standard deviation of intra-wall deformation magnitudes. Referring to FIG. 5, illustrated are example diagrams and graphs associated with predicting non-responders to chemoradiation via baseline MRIs in the example use case, according to various aspects discussed herein. At 510 and 530 are representative baseline T2w MRI scans from $S_2$ for two different patients showing the deformation field as colored arrows within the rectal wall (annotated in 510 and 530). At 520 and 540, the corresponding intra-wall deformation magnitudes for 510 and 530, respectively, are visualized as a heatmap, where higher values/shades correspond to higher D(c). At 550, boxplots of skewness in deformation magnitudes reveal intra-wall deformations in non-responders to chemoradiation are positively skewed (e.g., having larger magnitudes in NR patients, ypT3-4) compared to good responders (GR). At 560, a bar plot of AUC values is presented for different feature descriptors, showing that $\mathbb{F}_{def}^{r}$ resulted in a significantly higher performance than $\mathbb{F}_{def}^{p}$, $\mathbb{F}_{tex}^{r}$, and $\mathbb{F}_{tex}^{p}$. The results of the first experiment indicate that non-responders to chemoradiation may be associated with significantly higher structural deformations within the rectal wall on baseline MRI scans (as seen at 550, showing positive skew associated with non-responders), when compared to the healthy rectal atlas. This resonates with previous findings where it has been reported that smaller rectal tumors tend to respond favorably to chemoradiation, which would result in their being associated with less pronounced wall deformations (with reference to a healthy atlas). Further, the intra-wall StRAD descriptor ($\mathbb{F}_{def}^{r}$) also yielded the best overall AUC in this classification task ($\mathbb{F}_{def}^{r}$ is shown in the leftmost bar of 560, with a AUC of 0.73±0.05). This was significantly higher (p<0.001) than the AUCs for each of $\mathbb{F}_{def}^{p}$, $\mathbb{F}_{tex}^{r}$, and $\mathbb{F}_{tex}^{p}$.

Figure 6:
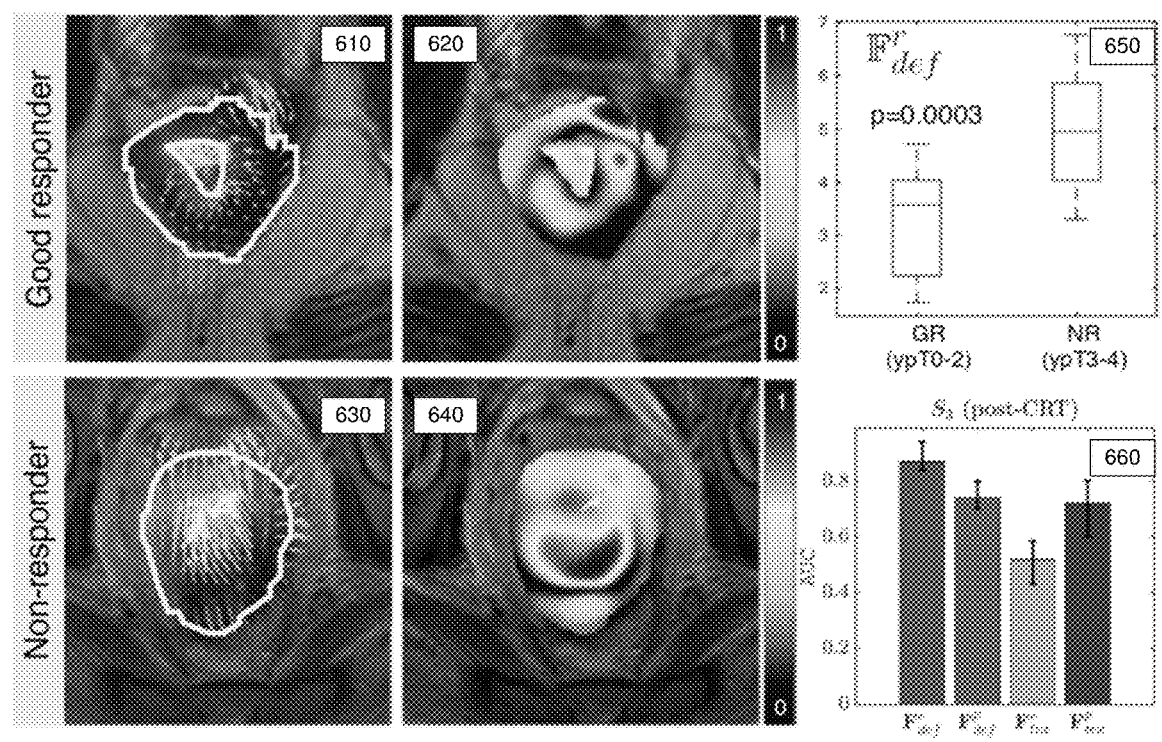
FIG. 6 illustrates example diagrams and graphs associated with identifying good responders after chemoradiation via post-therapy MRIs in the example use case, according to various aspects discussed herein.

Experiment 2: Identifying Good Responders After Chemoradiation via Post-Therapy MRIs In $S_3$, the median and standard deviation of the intra-wall deformation magnitude were identified as the most relevant StRAD descriptors. Referring to FIG. 6, illustrated are example diagrams and graphs associated with identifying good responders after chemoradiation via post-therapy MRIs in the example use case, according to various aspects discussed herein. At 610 and 630 are representative post-therapy T2w MRI scans from $S_3$ for two different patients showing the deformation field visualized as arrows within the annotated outline of the rectal wall. At 620 and 640 are the corresponding intra-wall deformation magnitudes for the patients of 610 and 630, respectively, visualized as heatmaps, where higher values/shades correspond to higher D(c). At 650, boxplots of standard deviation of deformation magnitudes within the rectal wall reveal significantly less variable deformations associated with good responders to chemoradiation (GR, ypT0-2) compared to non-responders (NR). At 660, a bar plot of AUC values is presented for different feature descriptors, showing that $\mathbb{F}_{def}^{r}$ resulted in a significantly higher performance than $\mathbb{F}_{def}^{p}$, $\mathbb{F}_{tex}^{r}$, and $\mathbb{F}_{tex}^{p}$. As can be seen from FIG. 6, good responders are associated with significantly lower and less variable structural intra-wall deformations. As non-responders (e.g., ypT3-4) are likely to have more tumor extent outside the rectal wall despite chemoradiation, this would be reflected in the rectal wall being more deformed with respect to the healthy rectal atlas. The intra-wall StRAD descriptor ($\mathbb{F}_{def}^{r}$) significantly outperformed all of $\mathbb{F}_{def}^{p}$, $\mathbb{F}_{tex}^{r}$, and $\mathbb{F}_{tex}^{p}$ in terms of AUC values for this classification task, with an AUC of 0.87±0:03, p<0.001, as shown at 660.

Conclusion

The example use case presented a novel suite of STructural Rectal Atlas Deformation (StRAD) features for characterizing intra- and peri-wall response to chemoradiation on rectal MRIs. The example use case involved construction of the first reference healthy rectal wall atlas, which was applied to compute tumor-related deformations on baseline and post-chemoradiation MRIs, separately. StRAD features from within the rectal wall were found to be most effective for characterizing tumor treatment response on MRI, revealing that non-responder RCa patients in both pre- and post-therapy settings were associated with significantly higher and more variable intra-wall deformations; likely occurring as a result of more aggressive tumor growth. By contrast, morphologic texture features performed significantly worse both for predicting as well as evaluating response to therapy via MRI. The example use case provides specific examples of embodiments, but it is to be understood that other embodiments can vary from those of the example use case in one or more aspects, including as discussed herein. Various embodiments can employ StRAD features validated on a larger cohort of data, including multiple sites, as well as evaluation of parameter sensitivity. Additionally, various embodiments can integrate StRAD featues with other morphologic descriptors and clinical variables to reliably predict and assess treatment response for rectal cancers in vivo.

Additional Embodiments

In various example embodiments, method(s) discussed herein can be implemented as computer executable instructions. Thus, in various embodiments, a computer-readable storage device can store computer executable instructions that, when executed by a machine (e.g., computer, processor), cause the machine to perform methods or operations described or claimed herein including operation(s) described in connection with methods 100, 200, 300, 400 or any other methods or operations described herein. While executable instructions associated with the listed methods are described as being stored on a computer-readable storage device, it is to be appreciated that executable instructions associated with other example methods or operations described or claimed herein can also be stored on a computer-readable storage device. In different embodiments, the example methods or operations described herein can be triggered in different ways. In one embodiment, a method or operation can be triggered manually by a user. In another example, a method or operation can be triggered automatically.

Embodiments discussed herein relate to training and/or employing classifiers to predict or determine a likelihood of response to chemoradiation treatment based on structural deformation and/or texture features associated with rectal cancer in a MRI image volume that are not perceivable by the human eye, and involve computation that cannot be practically performed in the human mind. As one example, machine learning and/or deep learning classifiers as described herein cannot be implemented in the human mind or with pencil and paper. Embodiments thus perform actions, steps, processes, or other actions that are not practically performed in the human mind, at least because they require a processor or circuitry to access digitized images stored in a computer memory and to extract or compute features that are based on the digitized images and not on properties of tissue or the images that are perceivable by the human eye. Embodiments described herein can use a combined order of specific rules, elements, operations, or components that render information into a specific format that can then be used and applied to create desired results more accurately, more consistently, and with greater reliability than existing approaches, thereby producing the technical effect of improving the performance of the machine, computer, or system with which embodiments are implemented.

Figure 7:
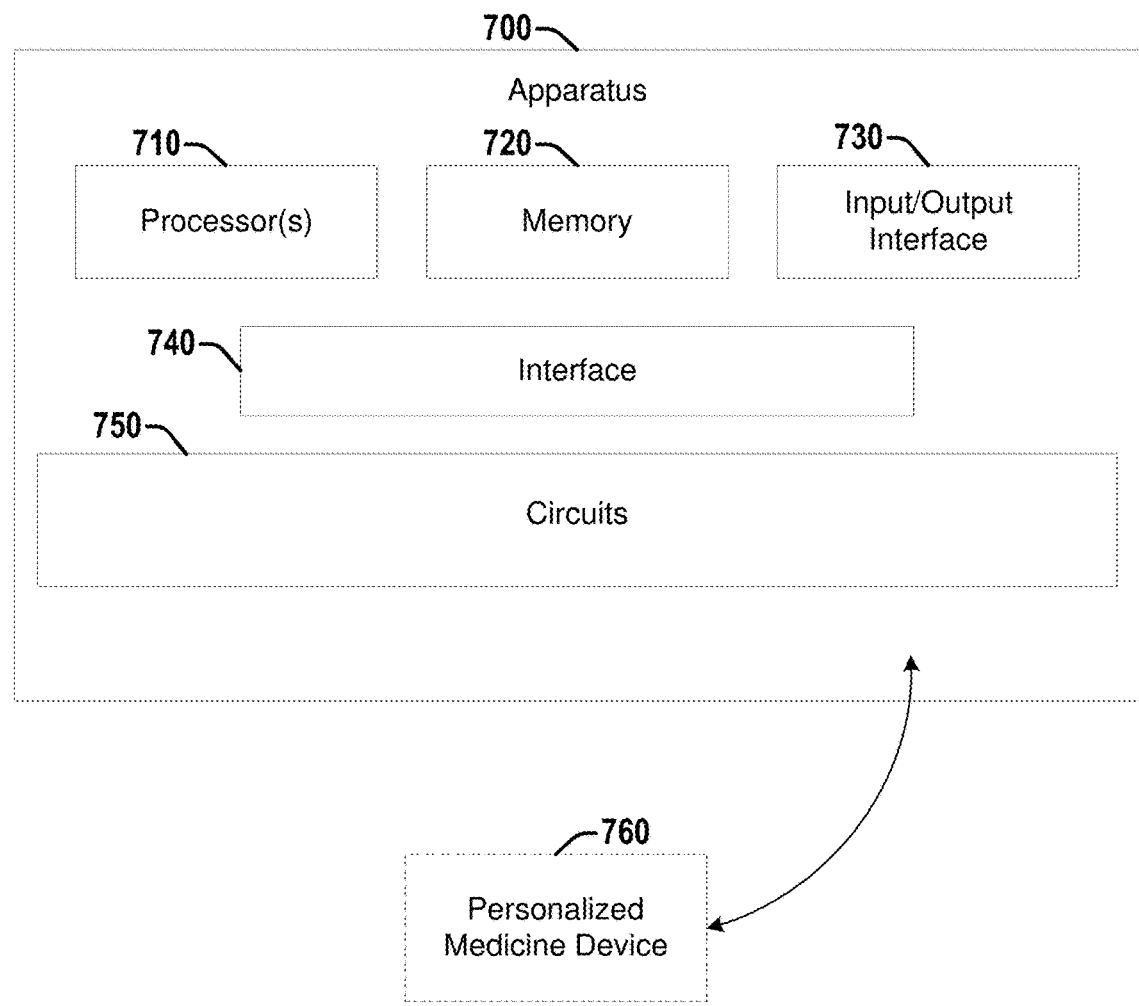
FIG. 7 illustrates a diagram of an example apparatus that can facilitate prediction and/or identification of responding and/or non-responding rectal cancer patients to chemoradiation treatment and/or training a machine learning (ML) classifier to perform such prediction and/or identification, according to various embodiments discussed herein.

Referring to FIG. 7, illustrated is a diagram of an example apparatus 700 that can facilitate prediction and/or identification of responding and/or non-responding rectal cancer patients to chemoradiation treatment and/or training a machine learning (ML) classifier to perform such prediction and/or identification, according to various embodiments discussed herein. Apparatus 700 can be configured to perform various techniques discussed herein, for example, various operations discussed in connection with sets of operations 100, 200, 300, and/or 400. Apparatus 700 can comprise one or more processors 710 and memory 720. Processor(s) 710 can, in various embodiments, comprise circuitry such as, but not limited to, one or more single-core or multi-core processors. Processor(s) 710 can include any combination of general-purpose processors and dedicated processors (e.g., graphics processors, application processors, etc.). The processor(s) can be coupled with and/or can comprise memory (e.g., of memory 720) or storage and can be configured to execute instructions stored in the memory 720 or storage to enable various apparatus, applications, or operating systems to perform operations and/or methods discussed herein. Memory 720 can be configured to store one or more image volumes (e.g., MRI, etc.) of a rectum, for example, a rectum of a patient with rectal cancer (e.g., for training and/or classification), or a healthy rectum (e.g., for construction of a rectal atlas). Each of the image(s) of the image volume can comprise a plurality of pixels or voxels, each pixel or voxel having an associated intensity. Memory 720 can be further configured to store additional data involved in performing operations discussed herein, such as for determining response to chemoradiation treatment of a rectal cancer patient and/or training a ML or DL model to determine response to chemoradiation treatment of a rectal cancer patient, as discussed in greater detail herein.

Apparatus 700 can also comprise an input/output (I/O) interface 730 (e.g., associated with one or more I/O devices), a set of circuits 750, and an interface 740 that connects the processor(s) 710, the memory 720, the I/O interface 730, and the set of circuits 750. I/O interface 730 can be configured to transfer data between memory 720, processor 710, circuits 750, and external devices, for example, a medical imaging device (e.g., MRI system or apparatus, etc.), and/or one or more remote devices for receiving inputs and/or providing outputs to a clinician, patient, etc., such as optional personalized medicine device 760.

The processor(s) 710 and/or one or more circuits of the set of circuits 750 can perform one or more acts associated with a method or set of operations discussed herein, such as set of operations 100, 200, 300, or 400. In various embodiments, different acts (e.g., different operations of a set of operations) can be performed by the same or different processor(s) 710 and/or one or more circuits of the set of circuits 750.

Apparatus 700 can optionally further comprise personalized medicine device 760. Apparatus 700 can be configured to provide the determination or prediction of response to chemoradiation treatment for a rectal cancer patient, or other data to personalized medicine device 760. Personalized medicine device 760 may be, for example, a computer assisted diagnosis (CADx) system or other type of personalized medicine device that can be used to facilitate monitoring and/or treatment of an associated medical condition. In some embodiments, processor(s) 710 and/or one or more circuits of the set of circuits 750 can be further configured to control personalized medicine device 760 to display the determination or prediction of response to chemoradiation treatment for the patient or other data on a computer monitor, a smartphone display, a tablet display, or other displays.

Examples herein can include subject matter such as an apparatus, an MRI system, a CT system, a personalized medicine system, a CADx system, a processor, a system, circuitry, a method, means for performing acts, steps, or blocks of the method, at least one machine-readable medium including executable instructions that, when performed by a machine (e.g., a processor with memory, an application-specific integrated circuit (ASIC), a field programmable gate array (FPGA), or the like) cause the machine to perform acts of the method or of an apparatus or system for generating system-independent quantitative perfusion measurements, according to embodiments and examples described.

Example 1 is a non-transitory computer-readable medium storing computer-executable instructions that, when executed, cause a processor to perform operations, comprising: accessing an image volume of a rectum comprising a rectal tumor, wherein the image volume was obtained prior to a chemoradiation treatment of the rectal tumor; generating a forward mapping based on non-rigidly registering a healthy rectal atlas to the image volume; inverting the forward mapping to generate an inverse mapping from the image volume to the healthy rectal atlas; determining, based on the inverse mapping, an associated deformation magnitude for each voxel of a plurality of voxels associated with the rectum; computing one or more structural deformation features based on the associated deformation magnitudes for the plurality of voxels; and predicting via a classifier whether or not the rectal tumor will respond to the chemoradiation treatment based at least in part on the one or more structural deformation features.

Example 2 comprises the subject matter of any variation of any of example(s) 1, wherein the image volume is a Magnetic Resonance Imaging (MRI) image volume.

Example 3 comprises the subject matter of any variation of any of example(s) 1-2, wherein the classifier is one of a Linear Discriminant Analysis (LDA) classifier, a Quadratic Discriminant Analysis (QDA) classifier, a Support Vector Machine (SVM) classifier, or a Random Forest (RF) classifier.

Example 4 comprises the subject matter of any variation of any of example(s) 1-3, wherein the one or more structural deformation features comprise one or more intra-wall deformation features associated with a wall of the rectum.

Example 5 comprises the subject matter of any variation of any of example(s) 4, wherein the operations further comprise computing one or more peri-wall texture features associated with a peri-wall region near a wall of the rectum, wherein the predicting via the classifier is based at least in part on the one or more peri-wall texture features.

Example 6 comprises the subject matter of any variation of any of example(s) 1-5, wherein the one or more structural deformation features comprise one or more peri-wall deformation features associated with a peri-wall region near a wall of the rectum.

Example 7 comprises the subject matter of any variation of any of example(s) 6, wherein the operations further comprise computing one or more intra-wall texture features associated with a wall of the rectum, wherein the predicting via the classifier is based at least in part on the one or more intra-wall texture features.

Example 8 comprises the subject matter of any variation of any of example(s) 1-7, wherein the one or more structural deformation features comprise one or more of the following computed for at least a subset of the plurality of voxels: a mean of the deformation magnitude, a median of the deformation magnitude, a standard deviation of the deformation magnitude, a skewness of the deformation magnitude, or a kurtosis of the deformation magnitude.

Example 9 comprises the subject matter of any variation of any of example(s) 1-8, wherein the operations further comprise computing one or more texture features based on the plurality of voxels, wherein the predicting via the classifier is based at least in part on the one or more texture features.

Example 10 comprises the subject matter of any variation of any of example(s) 9, wherein the one or more texture features comprise one or more of at least one intra-wall texture feature associated with a wall of the rectum or at least one peri-wall texture feature associated with a peri-wall region near the wall of the rectum.

Example 11 is a non-transitory computer-readable medium storing computer-executable instructions that, when executed, cause a processor to perform operations, comprising: accessing an image volume of a rectum comprising a rectal tumor, wherein the image volume was obtained after a chemoradiation treatment of the rectal tumor; generating a forward mapping based on non-rigidly registering a healthy rectal atlas to the image volume; inverting the forward mapping to generate an inverse mapping from the image volume to the healthy rectal atlas; determining, based on the inverse mapping, an associated deformation magnitude for each voxel of a plurality of voxels associated with the rectum; computing one or more structural deformation features based on the associated deformation magnitudes for the plurality of voxels; and determining, via a classifier, whether or not the rectal tumor is responsive to the chemoradiation treatment based at least in part on the one or more structural deformation features.

Example 12 comprises the subject matter of any variation of any of example(s) 11, wherein the image volume is a Magnetic Resonance Imaging (MRI) image volume.

Example 13 comprises the subject matter of any variation of any of example(s) 11-12, wherein the classifier is one of a Linear Discriminant Analysis (LDA) classifier, a Quadratic Discriminant Analysis (QDA) classifier, a Support Vector Machine (SVM) classifier, or a Random Forest (RF) classifier.

Example 14 comprises the subject matter of any variation of any of example(s) 11-13, wherein the one or more structural deformation features comprise one or more intra-wall deformation features associated with a wall of the rectum.

Example 15 comprises the subject matter of any variation of any of example(s) 14, wherein the operations further comprise computing one or more peri-wall texture features associated with a peri-wall region near a wall of the rectum, wherein the predicting via the classifier is based at least in part on the one or more peri-wall texture features.

Example 16 comprises the subject matter of any variation of any of example(s) 11-15, wherein the one or more structural deformation features comprise one or more peri-wall deformation features associated with a peri-wall region near a wall of the rectum.

Example 17 comprises the subject matter of any variation of any of example(s) 16, wherein the operations further comprise computing one or more intra-wall texture features associated with a wall of the rectum, wherein the predicting via the classifier is based at least in part on the one or more intra-wall texture features.

Example 18 comprises the subject matter of any variation of any of example(s) 11-17, wherein the one or more structural deformation features comprise one or more of the following computed for at least a subset of the plurality of voxels: a mean of the deformation magnitude, a median of the deformation magnitude, a standard deviation of the deformation magnitude, a skewness of the deformation magnitude, or a kurtosis of the deformation magnitude.

Example 19 comprises the subject matter of any variation of any of example(s) 11-18, wherein the operations further comprise computing one or more texture features based on the plurality of voxels, wherein the predicting via the classifier is based at least in part on the one or more texture features.

Example 20 comprises the subject matter of any variation of any of example(s) 19, wherein the one or more texture features comprise one or more of at least one intra-wall texture feature associated with a wall of the rectum or at least one peri-wall texture feature associated with a peri-wall region near the wall of the rectum.

Example 21 is a non-transitory computer-readable medium storing computer-executable instructions that, when executed, cause a processor to perform operations, comprising: accessing a plurality of training image volumes, wherein each image volume of the plurality of training image volumes comprises an associated rectum comprising an associated rectal tumor of that image volume, and wherein each image volume of the plurality of training image volumes has an associated known response to a chemoradiation treatment; for each image volume of the plurality of training image volumes: generating an associated forward mapping for that image volume based on non-rigidly registering a healthy rectal atlas to that image volume; invert the associated forward mapping to generate an associated inverse mapping for that image volume from that image volume to the healthy rectal atlas; determining, based on the associated inverse mapping for that image volume, an associated deformation magnitude for each voxel of a plurality of voxels associated with the associated rectum of that image volume; and computing, based on the associated deformation magnitudes for the plurality of voxels associated with the associated rectum of that image volume, an associated value for that image volume for each structural deformation feature of a plurality of structural deformation features; determining one or more best features for characterizing response to the chemoradiation treatment from among a set of features comprising the plurality of structural deformation features and a plurality of texture features, wherein the one or more best features are determined based at least on: the associated known responses for the plurality of training image volumes and the associated values for the plurality of training image volumes for the plurality of structural deformation features; and constructing a classifier configured to classify an additional image volume comprising an associated rectum with an associated rectal tumor as responsive or non-responsive to the chemoradiation treatment based at least on the one or more best features.

Example 22 comprises the subject matter of any variation of any of example(s) 21, wherein the operations further comprise computing, based on the plurality of voxels associated with the associated rectum of that image volume, an associated value for that image volume for each texture feature of the plurality of texture features, and wherein the one or more best features are determined based at least on the associated values for the plurality of training image volumes for the plurality of texture features.

Example 23 comprises the subject matter of any variation of any of example(s) 22, wherein the plurality of texture features comprise one or more of at least one intra-wall texture feature computed for that image volume from an associated wall of the associated rectum of that image volume or at least one peri-wall texture feature computed for that image volume from an associated peri-wall region near the associated wall of the rectum of the associated rectum of that image volume.

Example 24 comprises the subject matter of any variation of any of example(s) 21-23, wherein the operations further comprise: accessing a plurality of healthy image volumes, wherein each image volume of the plurality of healthy image volumes comprises an associated healthy rectum of that image volume, and wherein an associated rectal wall of the associated healthy rectum of that image volume has been annotated; and generating a healthy rectal wall atlas based on the associated rectal wall of the associated healthy rectum of each image volume of the plurality of healthy image volumes.

Example 25 comprises the subject matter of any variation of any of example(s) 21-24, wherein the plurality of training image volumes is a plurality of Magnetic Resonance Imaging (MRI) image volumes.

Example 26 comprises the subject matter of any variation of any of example(s) 21-25, wherein the classifier is one of a Linear Discriminant Analysis (LDA) classifier, a Quadratic Discriminant Analysis (QDA) classifier, a Support Vector Machine (SVM) classifier, or a Random Forest (RF) classifier.

Example 27 comprises the subject matter of any variation of any of example(s) 21-26, wherein the plurality of structural deformation features comprise one or more intra-wall deformation features computed for that image volume from an associated wall of the associated rectum of that image volume.

Example 28 comprises the subject matter of any variation of any of example(s) 21-27, wherein the plurality of structural deformation features comprise one or more peri-wall deformation features computed for that image volume from an associated peri-wall region near an associated wall of the associated rectum of that image volume.

Example 29 comprises the subject matter of any variation of any of example(s) 21-28, wherein the plurality of structural deformation features comprise one or more of the following computed for at least a subset of the plurality of voxels: a mean of the deformation magnitude, a median of the deformation magnitude, a standard deviation of the deformation magnitude, a skewness of the deformation magnitude, or a kurtosis of the deformation magnitude.

Example 30 comprises an apparatus comprising means for executing any of the described operations of examples 1-29.

Example 31 comprises a machine readable medium that stores instructions for execution by a processor to perform any of the described operations of examples 1-29.

Example 32 comprises an apparatus comprising: a memory; and one or more processors configured to: perform any of the described operations of examples 1-29.

References to "one embodiment", "an embodiment", "one example", and "an example" indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable storage device", as used herein, refers to a device that stores instructions or data. "Computer-readable storage device" does not refer to propagated signals. A computer-readable storage device may take forms, including, but not limited to, non-volatile media, and volatile media. Non-volatile media may include, for example, optical disks, magnetic disks, tapes, and other media. Volatile media may include, for example, semiconductor memories, dynamic memory, and other media. Common forms of a computer-readable storage device may include, but are not limited to, a floppy disk, a flexible disk, a hard disk, a magnetic tape, other magnetic medium, an application specific integrated circuit (ASIC), a compact disk (CD), other optical medium, a random access memory (RAM), a read only memory (ROM), a memory chip or card, a memory stick, and other media from which a computer, a processor or other electronic device can read.

"Circuit", as used herein, includes but is not limited to hardware, firmware, software in execution on a machine, or combinations of each to perform a function(s) or an action(s), or to cause a function or action from another logic, method, or system. A circuit may include a software controlled microprocessor, a discrete logic (e.g., ASIC), an analog circuit, a digital circuit, a programmed logic device, a memory device containing instructions, and other physical devices. A circuit may include one or more gates, combinations of gates, or other circuit components. Where multiple logical circuits are described, it may be possible to incorporate the multiple logical circuits into one physical circuit. Similarly, where a single logical circuit is described, it may be possible to distribute that single logical circuit between multiple physical circuits.

To the extent that the term "includes" or "including" is employed in the detailed description or the claims, it is intended to be inclusive in a manner similar to the term "comprising" as that term is interpreted when employed as a transitional word in a claim.

Throughout this specification and the claims that follow, unless the context requires otherwise, the words 'comprise' and 'include' and variations such as 'comprising' and 'including' will be understood to be terms of inclusion and not exclusion. For example, when such terms are used to refer to a stated integer or group of integers, such terms do not imply the exclusion of any other integer or group of integers.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

While example systems, methods, and other embodiments have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and other embodiments described herein. Therefore, the invention is not limited to the specific details, the representative apparatus, and illustrative examples shown and described. Thus, this application is intended to embrace alterations, modifications, and variations that fall within the scope of the appended claims.

What is claimed is:

1. A non-transitory computer-readable medium storing computer-executable instructions that, when executed, cause a processor to perform operations, comprising:
  accessing an image volume of a rectum comprising a rectal tumor, wherein the image volume was obtained prior to a chemoradiation treatment of the rectal tumor;
  generating a forward mapping based on non-rigidly registering a healthy rectal atlas to the image volume;
  inverting the forward mapping to generate an inverse mapping from the image volume to the healthy rectal atlas;
  determining, based on the inverse mapping, an associated deformation magnitude for each voxel of a plurality of voxels associated with the rectum;
  computing one or more structural deformation features based on the associated deformation magnitudes for the plurality of voxels; and
  predicting via a classifier whether or not the rectal tumor will respond to the chemoradiation treatment based at least in part on the one or more structural deformation features.

2. The non-transitory computer-readable medium of claim 1, wherein the image volume is a Magnetic Resonance Imaging (MRI) image volume.

3. The non-transitory computer-readable medium of claim 1, wherein the classifier is one of a Linear Discriminant Analysis (LDA) classifier, a Quadratic Discriminant Analysis (QDA) classifier, a Support Vector Machine (SVM) classifier, or a Random Forest (RF) classifier.

4. The non-transitory computer-readable medium of claim 1, wherein the one or more structural deformation features comprise one or more intra-wall deformation features associated with a wall of the rectum.

5. The non-transitory computer-readable medium of claim 4, wherein the operations further comprise computing one or more peri-wall texture features associated with a peri-wall region near the wall of the rectum, wherein the predicting via the classifier is based at least in part on the one or more peri-wall texture features.

6. The non-transitory computer-readable medium of claim 1, wherein the one or more structural deformation features comprise one or more peri-wall deformation features associated with a peri-wall region near a wall of the rectum.

7. The non-transitory computer-readable medium of claim 6, wherein the operations further comprise computing one or more intra-wall texture features associated with the wall of the rectum, wherein the predicting via the classifier is based at least in part on the one or more intra-wall texture features.

8. The non-transitory computer-readable medium of claim 1, wherein the one or more structural deformation features comprise one or more of the following computed for at least a subset of the plurality of voxels: a mean of the deformation magnitude, a median of the deformation magnitude, a standard deviation of the deformation magnitude, a skewness of the deformation magnitude, or a kurtosis of the deformation magnitude.

9. The non-transitory computer-readable medium of claim 1, wherein the operations further comprise computing one or more texture features based on the plurality of voxels, wherein the predicting via the classifier is based at least in part on the one or more texture features.

10. The non-transitory computer-readable medium of claim 9, wherein the one or more texture features comprise one or more of at least one intra-wall texture feature associated with a wall of the rectum or at least one peri-wall texture feature associated with a peri-wall region near the wall of the rectum.

11. A non-transitory computer-readable medium storing computer-executable instructions that, when executed, cause a processor to perform operations, comprising:
  accessing an image volume of a rectum comprising a rectal tumor, wherein the image volume was obtained after a chemoradiation treatment of the rectal tumor;
  generating a forward mapping based on non-rigidly registering a healthy rectal atlas to the image volume;
  inverting the forward mapping to generate an inverse mapping from the image volume to the healthy rectal atlas;
  determining, based on the inverse mapping, an associated deformation magnitude for each voxel of a plurality of voxels associated with the rectum;
  computing one or more structural deformation features based on the associated deformation magnitudes for the plurality of voxels; and
  predicting, via a classifier, whether or not the rectal tumor is responsive to the chemoradiation treatment based at least in part on the one or more structural deformation features.

12. The non-transitory computer-readable medium of claim 11, wherein the image volume is a Magnetic Resonance Imaging (MRI) image volume.

13. The non-transitory computer-readable medium of claim 11, wherein the classifier is one of a Linear Discriminant Analysis (LDA) classifier, a Quadratic Discriminant Analysis (QDA) classifier, a Support Vector Machine (SVM) classifier, or a Random Forest (RF) classifier.

14. The non-transitory computer-readable medium of claim 11, wherein the one or more structural deformation features comprise one or more intra-wall deformation features associated with a wall of the rectum.

15. The non-transitory computer-readable medium of claim 14, wherein the operations further comprise computing one or more peri-wall texture features associated with a peri-wall region near the wall of the rectum, wherein the predicting, via the classifier, is based at least in part on the one or more peri-wall texture features.

16. The non-transitory computer-readable medium of claim 11, wherein the one or more structural deformation features comprise one or more peri-wall deformation features associated with a peri-wall region near a wall of the rectum.

17. The non-transitory computer-readable medium of claim 16, wherein the operations further comprise computing one or more intra-wall texture features associated with the wall of the rectum, wherein the predicting, via the classifier, is based at least in part on the one or more intra-wall texture features.

18. The non-transitory computer-readable medium of claim 11, wherein the one or more structural deformation features comprise one or more of the following computed for at least a subset of the plurality of voxels: a mean of the deformation magnitude, a median of the deformation magnitude, a standard deviation of the deformation magnitude, a skewness of the deformation magnitude, or a kurtosis of the deformation magnitude.

19. The non-transitory computer-readable medium of claim 11, wherein the operations further comprise computing one or more texture features based on the plurality of voxels, wherein the predicting, via the classifier, is based at least in part on the one or more texture features.

20. The non-transitory computer-readable medium of claim 19, wherein the one or more texture features comprise one or more of at least one intra-wall texture feature associated with a wall of the rectum or at least one peri-wall texture feature associated with a peri-wall region near the wall of the rectum.

21. A non-transitory computer-readable medium storing computer-executable instructions that, when executed, cause a processor to perform operations, comprising:
  accessing a plurality of training image volumes, wherein each image volume of the plurality of training image volumes comprises an associated rectum comprising an associated rectal tumor of that image volume, and wherein each image volume of the plurality of training image volumes has an associated known response to a chemoradiation treatment;
  for each image volume of the plurality of training image volumes:
    generating an associated forward mapping for that image volume based on non-rigidly registering a healthy rectal atlas to that image volume;
    invert the associated forward mapping to generate an associated inverse mapping for that image volume from that image volume to the healthy rectal atlas;
    determining, based on the associated inverse mapping for that image volume, an associated deformation magnitude for each voxel of a plurality of voxels associated with the associated rectum of that image volume; and
    computing, based on the associated deformation magnitudes for the plurality of voxels associated with the associated rectum of that image volume, an associated value for that image volume for each structural deformation feature of a plurality of structural deformation features;
  determining one or more best features for characterizing response to the chemoradiation treatment from among a set of features comprising the plurality of structural deformation features and a plurality of texture features, wherein the one or more best features are determined based at least on: associated known responses for the plurality of training image volumes and associated values for the plurality of training image volumes for the plurality of structural deformation features; and
  constructing a classifier configured to classify an additional image volume comprising an associated additional rectum with an associated additional rectal tumor as responsive or non-responsive to the chemoradiation treatment based at least on the one or more best features.

22. The non-transitory computer-readable medium of claim 21, wherein the operations further comprise computing, based on the plurality of voxels associated with the associated rectum of that image volume, an associated value for that image volume for each texture feature of the plurality of texture features, and wherein the one or more best features are determined based at least on the associated values for the plurality of training image volumes for the plurality of texture features.

23. The non-transitory computer-readable medium of claim 22, wherein the plurality of texture features comprise one or more of at least one intra-wall texture feature computed for that image volume from an associated wall of the associated rectum of that image volume or at least one peri-wall texture feature computed for that image volume from an associated peri-wall region near the associated wall of the associated rectum of that image volume.

24. The non-transitory computer-readable medium of claim 21, wherein the operations further comprise:
  accessing a plurality of healthy image volumes, wherein each image volume of the plurality of healthy image volumes comprises an associated healthy rectum of that image volume, and wherein an associated rectal wall of the associated healthy rectum of that image volume has been annotated; and
  generating a healthy rectal wall atlas based on the associated rectal wall of the associated healthy rectum of each image volume of the plurality of healthy image volumes.

25. The non-transitory computer-readable medium of claim 21, wherein the plurality of training image volumes is a plurality of Magnetic Resonance Imaging (MRI) image volumes.

26. The non-transitory computer-readable medium of claim 21, wherein the classifier is one of a Linear Discriminant Analysis (LDA) classifier, a Quadratic Discriminant Analysis (QDA) classifier, a Support Vector Machine (SVM) classifier, or a Random Forest (RF) classifier.

27. The non-transitory computer-readable medium of claim 21, wherein the plurality of structural deformation features comprise one or more intra-wall deformation features computed for that image volume from an associated wall of the associated rectum of that image volume.

28. The non-transitory computer-readable medium of claim 21, wherein the plurality of structural deformation features comprise one or more peri-wall deformation features computed for that image volume from an associated peri-wall region near an associated wall of the associated rectum of that image volume.

29. The non-transitory computer-readable medium of claim 21, wherein the plurality of structural deformation features comprise one or more of the following computed for at least a subset of the plurality of voxels: a mean of the deformation magnitude, a median of the deformation magnitude, a standard deviation of the deformation magnitude, a skewness of the deformation magnitude, or a kurtosis of the deformation magnitude.

* * * * *